United States Patent [19]

Jackson, Jr. et al.

[11] 4,242,496
[45] Dec. 30, 1980

[54] LIQUID CRYSTAL COPOLYESTERS CONTAINING PHENYLHYDROQUINONE

[75] Inventors: Winston J. Jackson, Jr., Kingsport; Gary G. Gebeau, Johnson City; Herbert F. Kuhfuss, Kingsport, all of Tenn.

[73] Assignee: Eastman Kodak Company, Rochester, N.Y.

[21] Appl. No.: 971,987

[22] Filed: Dec. 21, 1978

Related U.S. Application Data

[63] Continuation-in-part of Ser. No. 903,369, May 5, 1978, abandoned.

[51] Int. Cl.$^3$ .............................................. C08G 63/60
[52] U.S. Cl. .................................... 528/190; 528/176; 528/191; 528/193; 528/194; 528/271
[58] Field of Search ............... 528/176, 193, 271, 190, 528/194, 191

[56] References Cited

U.S. PATENT DOCUMENTS

| | | | |
|---|---|---|---|
| 3,160,602 | 12/1964 | Kantor et al. ......................... | 528/176 |
| 3,637,595 | 1/1972 | Cottis et al. ........................... | 528/176 |
| 3,778,410 | 12/1973 | Kuhfuss et al. ....................... | 528/176 |
| 4,083,829 | 4/1978 | Calundann et al. ................... | 528/176 |
| 4,159,365 | 6/1979 | Payet ..................................... | 528/176 |

*Primary Examiner*—Lester L. Lee
*Attorney, Agent, or Firm*—William P. Heath, Jr.; Daniel B. Reece, III

[57] ABSTRACT

Disclosed are liquid crystal copolyesters having excellent mechanical properties. The copolyesters are prepared from an aromatic dicarboxylic acid, phenylhydroquinone and a p-acyloxybenzoic acid.

5 Claims, No Drawings

LIQUID CRYSTAL COPOLYESTERS CONTAINING PHENYLHYDROQUINONE

This is a continuation-in-part application of Ser. No. 903,369 filed May 5, 1978 and now abandoned.

This invention relates to liquid crystal polyesters prepared from an aromatic dicarboxylic acid, a phenylhydroquinone and a p-acyloxybenzoic acid.

In the last four decades, a wide variety of plastics has been developed to fulfill a wide variety of uses. Starting with the commercial introduction of nylon 66 in 1938 and continuing with the introduction of polyacetal, polycarbonate, polyphenylene oxide, polysulfone and polytetramethylene terephthalate, new plastics have been continually introduced to overcome deficiencies in previous plastics. As plastics were developed to satisfy even more demanding requirements, the aromatic character of the polymer often increased. As the amount of aromatic character increased, the melting point of the polymer increased. Ultimately, the increased melting point of highly aromatic polymers became so high that melt processing the polymer challenged the heating capacity of even the most sophisticated melt spinning and molding equipment and even approached the thermal stability limit of the polymers themselves. Thus, as the demand for polymers with greater and greater mechanical properties was met, the melting point of the polymers generally went up.

In very recent years the never-ending search for polymers with greater and greater mechanical properties has resulted in a fundamental breakthrough in polymer science by development of a new class of polymers exhibiting a general overall balance of mechanical properties substantially enhanced over previous polymers. These polymers have been described by various terms, including "liquid crystalline", "liquid crystal", and "anisotropic". Briefly, the polymers of this new class are thought to involve a parallel ordering of the molecular chains. The state wherein the molecules are so ordered is often referred to as the liquid crystal state or the nematic phase of the liquid crystal state. These polymers are prepared from monomers which are generally long, flat, and fairly rigid along the long axis of the molecule and have chain extending linkages that are either coaxial or parallel. Some liquid crystal polymers, often called lyotropic liquid crystals, can be brought into the liquid crystal state by dissolving the polymers in a solution, such as the solution spinning of poly(p-phenylene terephthalamide) from a sulfuric solution as disclosed in U.S. Pat. No. 3,671,542. Other liquid crystal polymers, often called thermotropic liquid crystals, can be more advantageously brought into the liquid crystal state by merely changing the temperature of the polymer.

Although the exact structure of liquid crystal polymers has not yet been fully understood, liquid crystal polymers are known to have exceptionally high mechanical properties compared to analogous polymers not having a liquid crystal character. For example, in U.S. Pat. No. 3,804,805, it is reported that a liquid crystal polyester prepared by the acidolysis of polyethylene terephthalate with 60 mole percent p-acetoxybenzoic acid has a flexural modulus of almost $18 \times 10^5$ psi., compared to a flexural modulus of only about $3 \times 10^5$ psi. for an analogous polyester prepared by an ester interchange procedure using dimethyl terephthalate, ethylene glycol, and 60 mole percent methyl p-hydroxybenzoate.

As is the case of previous polymers, it was recognized that increasing the aromatic character of a liquid crystal polyester would enhance the general overall balance of mechanical properties. Also, just as with previous polymers, when the aromatic character of the liquid crystal polyesters became greater, the melting points became greater. In the case of previous polymers, the increasing melting point merely challenged the heating capacity of conventional equipment to heat the polymer in order to melt-process the polymer into useful articles. In the case of liquid crystal polyesters, increasing the aromatic character of the polyester by preparing a wholly aromatic polyester did greatly enhance the mechanical properties but created melting points that far exceeded the capability of conventional equipment to melt polymer. For example, U.S. Pat. No. 3,637,595 discloses that aromatic liquid crystal polyesters prepared from terephthalic acid, hydroquinone and varying amounts of p-hydroxybenzoic acid melt in the general range of 800° to 900° F. Obviously, the melting point of these polymers is far too high and the thermal stability is insufficient to permit these polymers to be used in conventional melt-processing equipment.

Several solutions have been developed to solve the problem of aromatic liquid crystal polyesters having a melting point so high the polyester could not be melt processed in conventional equipment so as to take advantage of the outstanding mechanical properties of the aromatic polyester. One solution was to incorporate a substitutent on some of the aromatic rings of the polyester, preferably on the diol ring. For example, it is well known that use of chloro, methyl or ethyl hydroquinone lowers the melting point of the polyester. Although this approach can be used to lower the melting point, typically the mechanical properties are also substantially reduced.

We have now discovered aromatic liquid crystal polyesters which have solved the high melting point problem in aromatic liquid crystal polyesters because these polyesters have typical liquid crystal polyester properties as well as melting points that are low enough to permit the polyesters to be melt processed into useful articles, such as fibers and molded articles, using conventional equipment. We have accomplished this remarkable objective of lowering the melting point of aromatic liquid crystal polyesters and still retaining typical liquid crystal properties by using phenylhydroquinone or a substituted phenylhydroquinone as the principal diol.

Our invention, therefore, can be broadly thought of as a polyester prepared from a dicarboxylic acid, which can be terephthalic acid or 2,6-naphthalenedicarboxylic acid or mixtures thereof, phenylhydroquinone or a substituted phenylhydroquinone, and a p-acyloxybenzoic acid. This polyester can be specifically defined as a polyester having a fiber-forming molecular weight consisting essentially of the following radicals:

(A)

-continued

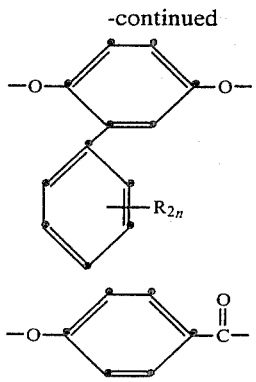

wherein R₁ is

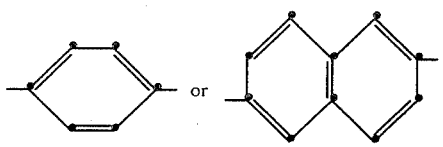

or mixtures thereof, R₂ is hydrogen, chlorine, bromine or a monovalent alkyl radical having one to four carbon atoms, n is 1, 2 or 3, and the range of

is from 25 to 80 mole percent, based on the total moles of radical (A) and radical (C) combined.

Preferably R₂ is hydrogen and the range of radical (C) is from 30 to 65 mole percent and more preferably the dicarboxylic acid is terephthalic acid.

As will also be recognized by those skilled in the art, radical (A) is the radical remaining after removal of the hydroxyl groups from the dicarboxylic acid, radical (B) is the radical remaining after removal of the terminal hydrogen atoms from phenylhydroquinone or a substituted phenylhydroquinone, and radical (C) is the radical remaining after removal of the terminal hydroxyl group and acyl group from a p-acyloxybenzoic acid.

Applicants are aware of prior art relating to the polyesters of the liquid crystal type. This art is discussed below.

German Offenlegungsschrift No. 2,520,820 discloses liquid crystal terephthalic acid/2,6-naphthalenedicarboxylic acid containing polyesters prepared using methyl or ethyl hydroquinone (Examples 4G and 4H). These polyesters can also contain a p-acyloxybenzoic acid.

U.S. Pat. No. 3,160,602 to Kantor et al discloses terephthalic acid containing polyesters containing substituted hydroquinone. Methyl, ethyl, and phenylhydroquinone are within the general formula disclosed in Column 4. Also, phenylhydroquinone is disclosed in Column 6 and Example 18.

U.S. Pat. No. 3,778,410 discloses a process for preparing a polyester by reacting a polyester prepared from a dicarboxylic acid and hydroquinone with a p-acyloxybenzoic acid.

Belgian Patent No. 828,935 contains a disclosure similar to German Offenlegunsschrift No. 2,520,820.

U.S. Pat. No. 3,637,595 discloses liquid crystal copolyesters which are prepared from terephthalic acid, hydroquinone and p-hydroxybenzoic acid.

U.S. Pat. No. 4,067,852 discloses liquid crystal polyesters prepared from 2,6-naphthalenedicarboxylic acid, an aromatic diol and a p-acyloxybenzoic acid.

Belgian Pat. No. 860,959 discloses polyesters of terephthalic acid, 2-phenylhydroquinone, and up to 10 mole %, based on all repeating units, of p-hydroxybenzoic acid (PHB). This PHB content is equivalent to 18 mole %, based on the total moles of terephthalic acid and PHB.

Table 1 (below) shows the effect of PHB content on the softening and melting points of polyesters of terephthalic acid, 2-phenylhydroquinone and PHB. It is very surprising that the copolyesters of the invention compared to those of the prior art have such low softening points, compared to their crystalline melting points. The softening points of liquid crystalline polyesters are generally about 10°–30° C. below the crystalline melting points when the polyesters contain only carbocyclic aromatic nuclei with their chain extending linkages coaxial or parallel and oppositely directed, whereas the softening points of some of the copolyesters of this invention are over 100° C. lower than the melting points. Also, surprisingly, some of the compositions prepared with 2,6-naphthalenedicarboxylic acid do not appear to have crystalline melting points by differential scanning calorimetry (see Table 2 below).

The advantage of the relatively low softening points of these polyesters is the ability to calender them or thermoform them at temperatures slightly above the softening points. Injection-molded bars and extruded sheets may be thermoformed at temperatures 10° C. to 25° C. above the softening points without loss of the high strength and high stiffness characteristic of these liquid crystalline polyesters.

The polyesters of the invention can be prepared by an acidolysis procedure well known in the art wherein terephthalic acid or 2,6-naphthalenedicarboxylic acid or combinations of terephthalic acid and 2,6-naphthalenedicarboxylic acid, a diacyl ester of phenylhydroquinone and a p-acyloxybenzoic acid are contacted under a temperature of around 260°–300° C. until most of the monocarboxylic acid has evolved. The temperature is then increased to about 350°–390° C. and the pressure decreased to form a high molecular weight polymer. If the polymer solidifies prior to achieving a fiber-forming molecular weight, its molecular weight may be increased to a fiber-forming value by heating particles of the polymer in an inert atmosphere or under reduced pressure at a temperature just below the softening point of the polymer.

The inherent viscosity of the polyesters of this invention can be routinely determined, and are at least 0.5, and preferably at least 1.0, measured at 25° C. using 0.1 gram of polymer per 100 ml. of a solvent composed by weight of 25 percent phenol, 35 percent tetrachloroethane, and 40 percent p-chlorophenol. The molecular weights of the polyester of the invention are high enough to be in the fiber-forming range. The minimum fiber-forming molecular weight of the polymer is thought to be around 5,000. In most cases the polyester of the invention has a molecular weight above 8,000 and can have a molecular weight as high as around 20,000 and in some instances the molecular weight can range up to 25,000 or even higher.

As a specific example, a mixture of 8.3 g (0.05 mole) terephthalic acid, 13.5 g (0.05 mole) of the diacetate ester of phenylhydroquinone and 9.0 g (0.05 mole) p-acetoxybenzoic acid is placed in a 100-ml. flask equipped with a stirrer, a short distillation column, and an inlet for nitrogen. The flask is evacuated and purged three times with nitrogen before being lowered into a metal bath maintained at 110° C. The mixture is heated under a nitrogen atmosphere with stirring to a temperature of 260° C. at which point acetic acid begins to distill rapidly from the flask. After the reaction mixture is heated with stirring at this temperature for about one-half hour, the temperature of the bath is increased to 300° C. for 30 minutes and then to 360° C. A vacuum of 0.5 mm of mercury is then applied over a period of 10 minutes. After stirring is continued under 0.5 mm of mercury at 360° C. for about 10 minutes, a high melt viscosity, opaque, fibrous, light tan polymer is obtained. The polymer has a molecular weight above 10,000 and an inherent viscosity of 2.9. The polymer can be melt spun into a fiber.

The above polymer is dried in an oven at 100° C. overnight and injection molded with a 1-oz. Watson-Stillman machine to give 2½×⅛×1/16-inch tensile bars and 5×½×⅛-inch flexure bars for testing. ASTM procedures are used for measuring the tensile strength and elongation (ASTM D1708), flexural modulus (ASTM D790), Izod impact strength ASTM D256 Method A), and heat deflection temperature (ASTM D648). Bars injection molded at 380° C. are smooth, clear and light amber. The bars have a notched Izod impact strength of 1.1 ft-lb/in. of notch, a tensile strength of 24,400 psi, an elongation of 11%, a flexural modulus of $28.1 \times 10^5$ psi, and a heat-deflection temperature of 179° C. (264 psi load).

Molded flexure bars of this composition are thermoformed at 210° C. using a thermoforming die and a Wabash press. The bar is preheated at 210° C. for 30 seconds and easily formed within 20 seconds.

Other polyesters within the scope of the invention containing 2,6-naphthalenedicarboxylic acid instead of all or part of the terephthalic acid can be prepared by a similar procedure but using slightly different reaction temperatures because of differences in melting points.

Crystalline melting points and softening points of polyesters prepared from 2-phenyl-1,4-phenylene diacetate, terephthalic acid and p-acetoxybenzoic acid are listed below. The softening points (Ts) are determined with a Du Pont 941 Thermomechanical Analyzer, using a 10-g weight on a tipped probe (0.025-in. diameter) and a scan rate of 10° C./min. The melting points (Tm) are determined with a Perkin-Elmer DSC-2 differential scanning calorimeter.

TABLE 1

| p-Acetoxybenzoic Acid, Mole % | Ts, °C. | Tm, °C. |
|---|---|---|
| 0 | 331 | 341 |
| 5 | 325 | 335 |
| 10 | 311 | 317 |
| 20 | 283 | 299 |
| 30 | 227 | 309 |
| 50 | 202 | 325 |
| 60 | 185 | 373 |
| 70 | 188 | 379 |
| 80 | 335 | 379 |

Softening points and crystalline melting points of polyesters prepared from 2-phenyl-1,4-phenylene diacetate, 2,6-naphthalenedicarboxylic acid, and p-acetoxybenzoic acid are as follows:

TABLE 2

| p-Acetoxybenzoic Acid, Mole % | Ts, °C. | Tm, °C. |
|---|---|---|
| 0 | 379 | 389 |
| 30 | 307 | 346 |
| 50 | 232 | None detected |
| 80 | 246 | None detected |

A wide variety of diesters of phenylhydroquinone can be used to prepare the polyester of this invention. Examples of diesters include the diacetate, dipropionate, dibutyrate and dibenzoate. The diacetate and dipropionate are preferred.

The p-acyloxybenzoic acid that provides radical (C) in the copolyester of this invention corresponds to the structure

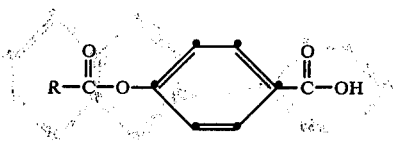

wherein R is phenyl or a monovalent alkyl radical of 1 to 8, preferably 1 to 4, carbon atoms. Examples of p-acyloxybenzoic acids include p-acetoxybenzoic acid, p-propionyloxybenzoic acid, p-butyryloxybenzoic acid, and p-phenoxybenzoic acid. Preferably, R is a monovalent alkyl radical having one carbon atom, in which case the p-acyloxybenzoic acid is p-acetoxybenzoic acid.

The p-acyloxybenzoic acids can be prepared by conventional processes, such as reaction between p-hydroxybenzoic acid and a carboxylic anhydride, such as acetic anhydride. Other processes for preparation of the p-acyloxybenzoic aromatic carboxylic acids are well known in the art.

The polyesters of this invention have been described as "consisting essentially of" radicals (A), (B) and (C). By the term "consisting essentially of", and words of similar import, we mean that the polyester can contain other divalent radicals in minor amounts as long as the mechanical properties, softening point, and melting point of the polyester remain unobvious in view of the prior art. For example, minor amounts of other isomers of naphthalenedicarboxylic acid can be used. By the term "consisting essentially of" we also mean that the polyester of this invention may contain nucleating agents, fillers, pigments, glass fibers, asbestos fibers, antioxidants, stabilizers, plasticizers, lubricants, fire-retardants, and other additives.

The invention has been described in detail with particular reference to preferred embodiments thereof, but it will be understood that variations and modifications can be effected within the spirit and scope of the invention.

We claim:

1. A copolyester having a fiber-forming molecular weight consisting essentially of the following divalent radicals:

-continued

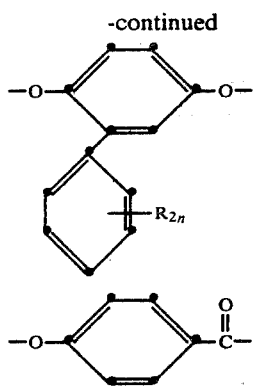

wherein $R_1$ is

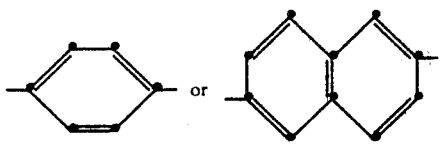

or mixtures thereof, $R_2$ is hydrogen, chlorine, bromine or a monovalent alkyl radical having one to four carbon atoms, n is 1, 2 or 3, and the range of (B)

is from 25 to 80 mole percent, based on the total moles of radical (A) and radical (C) combined.

2. The copolyester of claim 1 wherein the range of (C)

is from 30 to 65 mole percent.

3. The copolyester of claim 1 wherein $R_1$ is

4. Copolyester of claim 1 wherein $R_2$ is hydrogen.

5. Shaped article made from the copolyester of claim 1.

* * * * *